Aug. 28, 1962
A. D. HARBIN, JR., ETAL
3,051,631
METHOD AND APPARATUS FOR THE CONTROL OF
OXIDATION-REDUCTION REACTIONS
Filed April 7, 1959
2 Sheets-Sheet 1
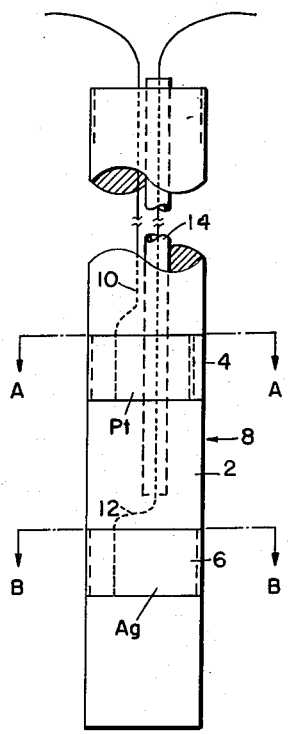
FIG. I
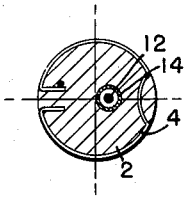
FIG. II
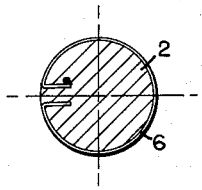
FIG. III
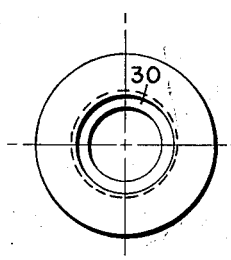
FIG. IV
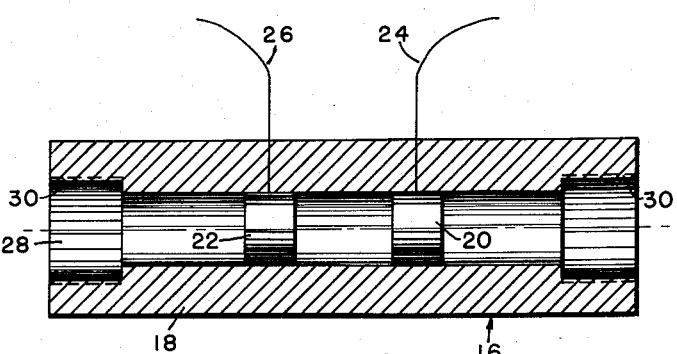
FIG. V
INVENTOR
ADIE D. HARBIN, JR.
HAROLD E. MUNNS
BY *Warburton & Cross*
ATTORNEY Aug. 28, 1962  A. D. HARBIN, JR., ETAL  3,051,631
METHOD AND APPARATUS FOR THE CONTROL OF
OXIDATION-REDUCTION REACTIONS
Filed April 7, 1959  2 Sheets-Sheet 2
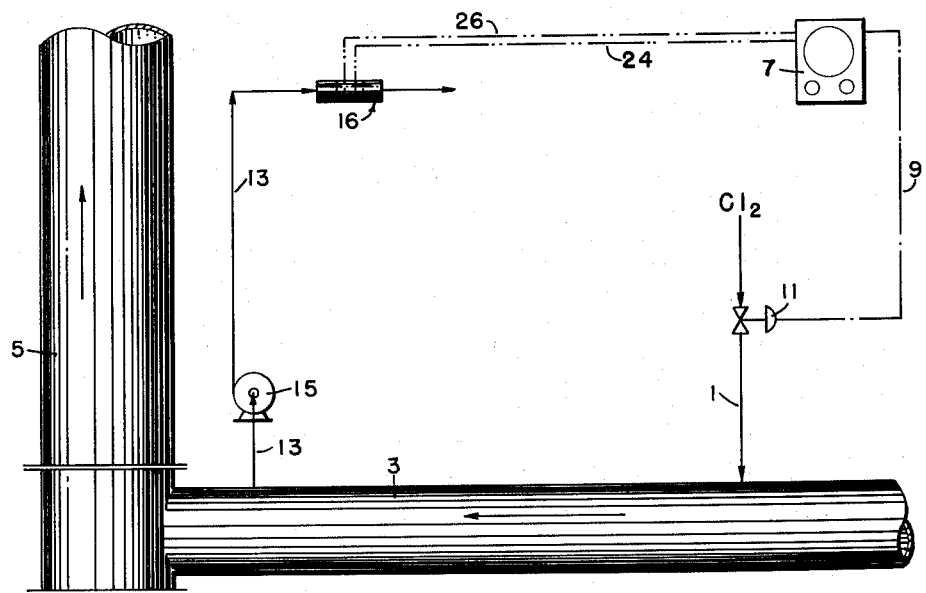
FIG. VII
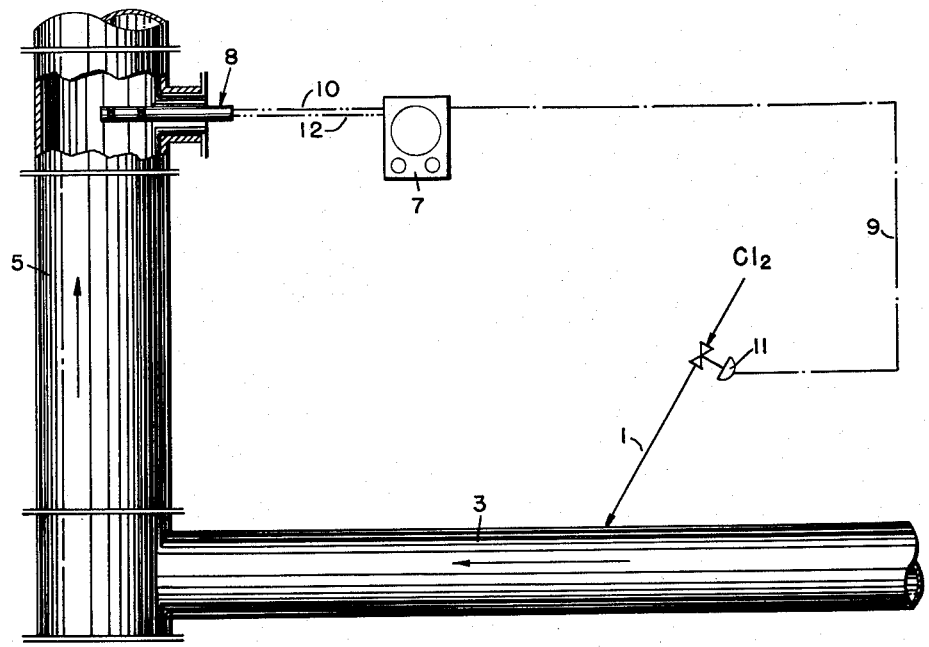
FIG. VI
INVENTOR
ADIE D. HARBIN, JR.
HAROLD E. MUNNS
BY *Warburton & Cross*
ATTORNEY

United States Patent Office 3,051,631
Patented Aug. 28, 1962

3,051,631
METHOD AND APPARATUS FOR THE CONTROL OF OXIDATION-REDUCTION REACTIONS
Adie D. Harbin, Jr., Painesville, and Harold E. Munns, Perry, Ohio, assignors to Diamond Alkali Company, Cleveland, Ohio, a corporation of Delaware
Filed Apr. 7, 1959, Ser. No. 804,835
15 Claims. (Cl. 204—1)

This invention relates to the art of measuring the oxidation-reduction potential of a chemical reaction involving a halogen and more particularly relates to a cell or sensing device by means of which this oxidation-reduction potential may be measured.

In recent years, a great deal of emphasis has been placed on the automatic control of various industrial processes. Such automatic control has been found to be desirable not only in mechanical or assembling processes but in chemical processes as well. However, it is generally much more difficult to effect the automatic operation of a chemical process than a mechanical type process in that, the control of such a process is frequently dependent upon the occurrence or cessation of a reaction, which reaction is itself usually not visually observable. Thus, to control automatically any chemical process, there must be a means by which a measurement of a chemical reaction or of a factor which is proportional to the chemical reaction, can be made and such measurement must be translatable into an understandable and meaningful unit of measure.

Although many chemical processes are not susceptible to automatic control because they fail to meet the above criteria, processes wherein one reactant undergoes oxidation while a second reactant undergoes reduction, which reactions are commonly referred to as oxidation-reduction reactions, are generally amenable to automatic control. In this class of reactions an electrical potential is produced, the measurement of such potential being a well known technique of physical chemistry, the unit of measure used generally being the millivolt. For the most part, the measurement of the electrical potential produced by such a reaction is readily correlated to the extent to which the reaction has progressed, there generally being a drastic change of the potential once the reaction has gone to completion. However, for even these processes to be controlled automatically, the speed of the oxidation-reduction reaction must be sufficiently rapid so that an appreciable potential is produced. Secondly, contaminating substances, particularly those capable of causing interfering oxidation reactions, must be held to a minimum and, thirdly, the pH of the solution must be controlled so that it does not affect the oxidation-reduction potential measurement, the oxidation-reduction potential in some systems being affected by changing pH.

Exemplary of chemical processes involving oxidation-reduction reactions which meet the above requirements are the bleaching of paper pulp using chlorine and processes for the manufacture of hypochlorite bleach liquor. Additionally, other processes which utilize the oxidizing power of the halogens and in particular chlorine, such as the treatment of water or waste materials, can also be controlled automatically from the measurement of the electrical potential produced by the oxidation-reduction reaction taking place in the process.

Up to the present time, the measurement of the potential produced by the oxidation-reduction reaction in chemical processes, such as those set forth above, has been made with a potential measuring cell commonly referred to as an oxidation-reduction potential cell. Cells of this type which have been available for industrial use are comprised of two pencil-like probes, one probe containing a reference electrode, such as a calomel electrode or a silver electrode, while the other probe contains a platinum electrode. Although these cells are quite satisfactory insofar as the potential measurement obtained is concerned, when used in commercial processes they are found to be subject to numerous disadvantages.

The principal disadvantage of the presently used cells is in their construction. Almost without exception, these cells are of glass structure, such cells having been originally intended solely for laboratory use. This construction has been found to be too fragile to withstand the rigorous handling encountered in a plant process. Additionally, many of these cells use a calomel electrode as the reference electrode. Such electrode requires constant refilling with solution and additionally is subject to plugging of the opening in the glass body for the salt bridge connecting the calomel material and the reactants. Even those cells in which the calomel reference electrode has been placed with one of silver have required frequent maintenance, thus necessitating frequent removal of the electrodes from the process control system. Moreover, in the cells presently in use, the electrodes are sealed into the cell body by mechanical means, which type of seal has not been satisfactory in that the reactant solution often penetrates the seal and contacts the electrode leads, thereby shorting out the cell. Further, when cells of this type are used in a pulp chlorination process, the pulp fibers tend to bridge the space between the two electrode probes, thus making the cell give an erroneous reading. In addition to the foregoing disadvantages, the present cells have of necessity been quite expensive, either in initial cost or replacement cost or both. These disadvantages have been largely responsible for limiting the application of oxidation-reduction potential measurement and/or control in many industries.

It is, therefore, an object of the present invention to provide an oxidation-reduction potential cell for use in halogenation reactions and particularly chlorination reactions, which cell is designed specifically to meet the problems of industrial process measurements.

Another object of the present invention is to provide a cell of the above type which does not used a calomel electrode as a reference electrode.

A further object of the present invention is to provide a cell as described above which is easily and economically made and which will withstand the rough handling encountered in making oxidation-reduction potential measurements in an industrial process.

These and other objects will become apparent to those skilled in the art from the description of the invention which follows:

In the drawings which are attached hereto and form a part hereof, FIG. I is a plan view of one embodiment of the apparatus of the present invention, FIG. II is a cross section taken along line A—A of FIG. I, FIG. III is a cross section taken along the line B—B of FIG. I, FIG. IV is an end view of a second embodiment of the apparatus of the present invention. FIG. V is a partial longitudinal cross section of the apparatus of FIG. IV, exposing the ring-shaped electrodes imbedded in the body of the apparatus of FIG. IV, FIG. VI is a schematic flow diagram showing a typical application for the embodiment of the present apparatus shown in FIG. I and FIG. VII is a schematic flow diagram showing a typical application for the embodiment of the apparatus shown in FIG. IV.

The apparatus of the present invention envisions a cell having a unitary cell body, which body is formed of an electrically non-conductive material that is resistant to solutions of oxidizing and reducing agents, strong and weak acid and alkali solutions and which will withstand temperatures up to at least about 200° F. The surface of the cell body which is exposed to the reactants whose oxidation-reduction potential is to be measured, has imbedded therein and bonded thereto, two electrodes, which electrodes are separated from each other by the nonconductive material of the cell body. These two electrodes, which have a surface of platinum and silver respectively, are imbedded in and formed integrally with the surface of the cell body so that the electrodes do not protrude any appreciable distance beyond the surface of the cell body. Lead wires, to which may be attached any desired recording and/or control apparatus, pass through the cell body and are secured to the electrodes within the body of the cell, said leads being imbedded in and bonded to the nonconductive material of which the cell body is formed.

More specifically, the apparatus of the present invention includes two embodiments, the first being a cell which may be placed within the reactants whose oxidation-reduction potential is to be measured, and the second being a cell through which the reactants whose oxidation-reduction potential is to be measured may be passed. In the first embodiment the cell body is preferably an elongated, solid cylindrical member formed of an electrically nonconductive plastic material resistant to high temperatures as well as solutions of oxidizing and reducing agents and weak and strong acids and alkalies. At one end of the cylindrical cell body is formed two electrode members, one having a surface of platinum and one having a surface of silver. These electrode members are imbedded in the plastic material of the cell body and are separated from each other by this plastic material. Within the cylindrical cell body, lead wires are secured to the respective electrodes, which lead wires are similarly imbedded within the nonconductive plastic material of the cell body. These lead wires pass through the cell body and after leaving the cell body are connected to any desired recording and/or controlling apparatus.

In the second embodiment of the apparatus of the present invention, the cell body is preferably a hollow cylindrical member formed of an electrically nonconductive plastic material, as with the first embodiment. In this embodiment, however, the two electrode members are formed at the inner surface of the hollow cylindrical cell member, being imbedded in the nonconductive plastic material of the cell body so as to be bonded thereto. Similarly, as with the first embodiment, the leads are secured to the electrode within the nonconductive plastic material and are imbedded therein. Thus, the first embodiment, in the form of a solid elongated cylinder with the electrodes exposed at the outer surface thereof is adapted to be placed into the reaction mixture whose oxidation-reduction potential is to be measured. In contrast, the second embodiment, in the form of a hollow cylinder having the electrode members exposed within the cylinder, is adapted for passing the reactants through the cylinder in contact with the electrodes to measure the oxidation-reduction potential of the reactants.

The material of which the cell bodies are constructed may be selected from any nonconductive plastic material which will resist temperatures up to at least about 200° F. and which additionally will be resistant to the corrosive action of solutions of oxidizing and reducing agents and strong and weak acids and alkalies. Additionally, it is desirable that the nonconductive plastic material be one which may be potted, or cast, as these terms are generally understood in the resin molding art, inasmuch as such method is ideally suited to forming the cell members of the present invention so that the electrode portions thereof are imbedded within the cell body. Examples of materials which have been found to be satisfactory are polyvinyl chloride, the various epoxy resins and mixtures of these resins and polyester resins. However, excellent results have been obtained where using an epoxy resin either alone or in admixture with a polyester resin, and for this reason these materials are preferred in forming the cell bodies of the present apparatus.

Referring now to FIG. I of the drawing, the probe type cell 8 is comprised of an elongated solid cylindrical member 2 having a platinum surfaced electrode 4 and a silver surfaced electrode 6 formed at one end thereof. The platinum and silver electrodes are spaced apart from each other and are imbedded in the cell body member 2, so as to be substantially flush with the outer surface of the cell body. The lead wires 10 and 12 to the electrodes 4 and 6, respectively, pass through the cell body 2 and are secured to the electrodes within the body of the cell. The leads 10 and 12 are shown as being insulated from each other by means of a glass tubing 14 through which lead 12 passes. However, any other suitable means for insulating the leads from each other may be used. As shown in FIGS. II and III, the platinum and silver electrodes, as well as the leads 10 and 12, are imbedded within the cell body member 2. In this manner, the electrodes and leads are sealed within the body of the cell so that they not only are insulated from each other but, additionally, so that it is impossible for any of the reactant material, whose oxidation-reduction potential is being measured, to leak into the cell, contact the leads and thereby cause a short circuit of the cell.

Referring now to FIGS. IV and V, the flow through type cell embodiment 16 comprises a hollow cylindrical member 18 having a cylindrical passage 28 therethrough. Within this passage 28, the platinum surfaced electrode 22 and the silver surfaced electrode 20 are disposed. These electrodes are imbedded within the cell body 18 so as to be substantially flush with the walls of the cell body defining the passage 28. The lead wires 24 and 26 to the electrodes 20 and 22, respectively, are likewise imbedded within the plastic material of the cell body member 18, being attached to their respective electrodes within the cell body member. The ends of the cell body member 18 are threaded, as at 30, so that the cell may be readily placed into a stream of the reactants whose oxidation-reduction potential is to be measured. It will thus be seen that as with the probe type cell described above, the electrodes of the present embodiment as well as leads thereto, are sealed within the cell body member so that they are not only insulated from each other but, additionally, are effectively sealed from the reactant solution so that none of it can come in contact with the leads and short circuit the cell. Referring now to FIGS. VI and VII, in FIG. VI there is shown a schematic flow diagram of a paper pulp chlorination process wherein the oxidation-reduction potential reaction of the process is measured using the probe type embodiment 8 of the cell of the present invention. Chlorine is introduced through line 1 into the mixing chamber 3 through which the pulp slurry flows. The slurry of pulp which is to be chlorinated is reacted with the chlorine in the chlorination tower 5. The probe type cell 8 is inserted in the tower 5 so as to measure the oxidation-reduction potential of reaction within the chlorination tower. The lead wires 10 and 12 from the cell 8 are connected to an oxidation-reduction recorder-controller 7, which apparatus through control line 9 operates valve 11 so as to control the amount of chlorine which is added through line 1 to the pulp slurry.

The schematic flow diagram of FIG. VII is similar to that of FIG. VI except that instead of inserting a probe type cell in the chlorination tower 5, a sample stream is removed by means of line 13 and pump 15 to pass through the flowthrough cell embodiment 16 of the present invention. In passing through the cell 16, the oxidation-reduction potential of the reaction stream is measured, and as in FIG. VI, the recorder-controller 7, by means of control line 9 and valve 11, controls the amount of chlorine added to the mixing chamber 3. It will be appreciated that in these applications, the oxidation-reduction potential produced is related at any given time only to the ratio of chlorine to chloride ions. Thus, it is evident that the potential produced will decrease as the chlorine is consumed in the reaction. Control apparatus can, therefore, be set so as to maintain any desired oxidation-reduction potential within the reaction, and, hence, any desired amount of chlorine. In this manner, a very close control of the desired end point of these processes can be obtained.

In an actual chlorination of a pulp slurry it is found that the reaction is approximately 80% complete in the first minute, about 90% complete within the first six minutes and substantially 100% complete in about 90 minutes. Thus, inasmuch as for control purposes the speed of the reaction must be sufficiently rapid to produce a measureable potential, it is apparent that if the apparatus of the present invention is contacted with the reactants of the process anywhere within about the first six minutes of reaction time, and preferably at about the end of one minute reaction time, the potential produced will be sufficient to afford a control of the reaction. By determining what potential is necessary at this point in the reaction to give the desired end product and setting the control apparatus to maintain this potential, while using a constant chlorine pressure and temperature, the changes in chlorine demand for the pulp solution can be compensated for by changes in the chlorine supply. As the ratio of chlorine to chloride ions changes at this point in the process, the potential produced by the reaction at this point will vary accordingly. Upon this variation in the potential, as sensed by the apparatus of the present invention, the control portion of the system will adjust the chlorine supply valve so as to re-establish the potential at the previously determined desired point. In this manner, the pulp treated in the process will be of a consistent quality and, additionally, chlorine waste by over-chlorination will be prevented.

Similarly, in the actual production of a bleach solution by the reaction of chlorine with sodium hydroxide, it is found that when the reaction is complete, there is a sudden shift in the potential produced by the reaction, which shift in potential is readily sensed by the apparatus of the present invention. Inasmuch as in such a process the reaction of chlorine with sodium hydroxide is substantially instantaneous, the cell of the present invention should be placed in the reactant stream within 10–20 seconds of the point of chlorine addition. Once the proper potential has been determined for this point in the process to give the desired excess alkalinity in the bleach solution product, this potential becomes a set point on the control apparatus. As in the pulp chlorination process, variations in the chlorine to chloride ion ratio at this point, will be sensed by the cell of the present invention and indicated as a variation in the potential. The controlling apparatus by varying the chlorine supply so as to hold this potential constant, will enable the production of a bleach solution having a constant degree of excess alkalinity.

It is, therefore, seen that the cell of the present invention overcomes the disadvantages of the cells presently in use in that it utilizes a silver reference electrode rather than a calomel electrode, the electrodes are imbedded in the cell body so that there can be no leakage to the electrode leads and the bulky, fragile construction of the presently used laboratory type cells has been eliminated. Moreover, by imbedding the electrodes in a single cell body so as to be substantially flush therewith, there is no bridging between the electrodes when the cell is used in a process containing fibrous materials, such as a pulp chlorination process. It has also been found that the overall cost of the present cell is considerably less than that of the presently used cells, thus making it more feasible for industrial use.

While there have been described various embodiments of the invention, the methods and apparatus described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An apparatus for use in measuring the oxidation-reduction potential produced in the reactions involving chlorine which comprises a unitary cell body of an electrically nonconductive non-fragile material resistant to shattering on impact and further resistant to high temperatures, solutions of strong and weak alkalies and acids, and solutions of oxidizing and reducing agents, the surface of said cell body which is exposed to the reactants whose oxidation-reduction potential is to be measured having two electrodes imbedded therein and bonded thereto, one electrode having a surface of silver and the other electrode having a surface of platinum, the silver and platinum surfaces of said electrodes being substantially flush with the surface of the cell body, said electrodes having leads secured thereto, said leads being secured to said electrodes in the cell body and imbedded and bonded to the material of which said cell body is formed so as to be insulated from each other and sealed from any contact with the reactants whose oxidation-reduction potential is being measured.

2. The apparatus as claimed in claim 1 wherein the electrically nonconductive material of which the cell body is formed is a plastic material which is resistant to temperatures of at least about 200° F., solutions of weak and strong acids and alkalies and solutions of oxidizing and reducing agents.

3. The apparatus as claimed in claim 2 wherein the plastic material is an epoxy resin.

4. An apparatus for use in measuring the oxidation-reduction potential produced in reactions involving chlorine which comprises a unitary elongated, solid cylindrical cell body formed of an electrically nonconductive, non-fragile material resistant to shattering on impact and further resistant to high temperatures, solutions of strong and weak alkalies and acids, and solutions of oxidizing and reducing agents, said cell body having two electrodes imbedded in and bonded to the outer surface thereof, one electrode having a surface of silver and the other electrode having a surface of platinum, the silver and platinum surfaces of said electrode being substantially flush with the outer surface of said cell body, and leads secured to said electrodes within said cell body, said leads being imbedded in and bonded to the material of which said cell body is formed, so as to be insulated from each other and sealed from any contact with the reactants whose oxidation-reduction potential is being measured.

5. The apparatus as claimed in claim 4 wherein the electrically nonconductive material of which the cell body is formed is a plastic material which is resistant to temperatures of at least about 200° F., solutions of weak and strong acids and alkalies, and solutions of oxidizing and reducing agents.

6. The apparatus as claimed in claim 5 wherein the plastic material is an epoxy resin.

7. An apparatus for use in measuring the oxidation-reduction potential produced in reactions involving chlorine which comprises a unitary elongated hollow cylindrical cell body formed of an electrically nonconductive, non-fragile material resistant to shattering on impact and further resistant to high temperatures, solutions of strong and weak alkalies and acids, and oxidizing and reducing agents, said cell body having a central passageway through the entire length thereof, through which passageway are passed the reactants whose oxidation-reduction potential is to be measured, said cell body further having two electrodes imbedded in and bonded to the surface of said cell which defines said central passageway, one of said electrodes having a surface of silver and the other said electrode having a surface of platinum, the silver and platinum surfaces of said electrodes being substantially flush with the said surface of the cell body and leads secured to said electrodes within said cell body, said leads being imbedded in and bonded to the material of which said cell body is formed so as to be insulated from each other and sealed from any contact with the reactants whose oxidation-reduction potential is being measured.

8. The apparatus as claimed in claim 7 wherein the electrically nonconductive material of which the cell body is formed is a plastic material which is resistant to temperatures of at least about 200° F., solutions of weak and strong acids and alkalies, and solutions of oxidizing and reducing agents.

9. The apparatus as claimed in claim 8 wherein the plastic material is an epoxy resin.

10. In the method of measuring the oxidation-reduction potential produced in reactions involving chlorine wherein the reactants whose oxidation-reduction potential is to be measured are passed in contact with two electrodes of an oxidation-reduction potential sensing device, with electrodes having a surface of platinum and silver, respectively, and measuring the oxidation-reduction potential thus sensed by said device, the improvement which comprises passing said reactants in contact with two electrodes having surfaces of platinum and silver, respectively, which are imbedded in and bonded to a unitary cell body so as to be substantially flush with the surface of said cell body in contact with said reactants and having leads from said electrodes imbedded in and bonded to said cell body so as to be insulated from each other and sealed from any contact with said reactants.

11. The method as claimed in claim 10 wherein the reactants are passed in contact with two electrodes which are imbedded in and bonded to the outer surface of a solid cylindrical cell body.

12. The method as claimed in claim 10 wherein the reactants are passed through a hollow, cylindrical cell body having a central passageway through the entire length thereof, wherein the two electrodes are imbedded in and bonded to the surface of said cell body defining said passageway.

13. A control system for the control of oxidation-reduction reactions using chlorine which comprises a reaction chamber wherein the oxidation-reduction reaction takes place, means for introducing chlorine into said reaction chamber, means for regulating the amount of chlorine introduced into said reaction chamber, said regulating means being operated by a control means which is actuated by a change in the oxidation-reduction potential produced in the reaction and an oxidation-reduction potential sensing device in contact with the reactants which are undergoing the oxidation-reduction reaction, said sensing device comprising two electrodes having surfaces of platinum and silver, respectively, said electrodes being imbedded in and bonded to a unitary cell body so as to be substantially flush with the surface of said cell body in contact with said reactants, said cell body being formed of an electrically non-conductive, non-fragile material resistant to shattering on impact and further resistant to high temperatures and solutions of alkalies, acids, oxidizing and reducing agents, said sensing device further having electrical leads from said electrodes imbedded in and bonded to the cell body so as to be insulated from each other and sealed from any contact with the reactants, said leads being connected to the control means so as to transmit thereto the potential produced in the reaction, thereby actuating said control means to effect a regulation of the amount of chlorine introduced into the reaction.

14. The control system as claimed in claim 13 wherein the sensing device is comprised of a solid cell body having the two electrodes imbedded in and bonded to the outer surface thereof.

15. The control system as claimed in claim 13 wherein the sensing device is comprised of a cell body having a central passageway through the entire length thereof and having the two electrodes imbedded in and bonded to the surface of said cell body defining said passageway.

References Cited in the file of this patent

UNITED STATES PATENTS

| | | |
|---|---|---|
| 1,807,821 | Behr | June 2, 1931 |
| 2,289,589 | Pomeroy | July 14, 1942 |
| 2,370,871 | Marks | Mar. 6, 1945 |
| 2,651,612 | Haller | Sept. 8, 1953 |
| 2,832,734 | Eckfeldt | Apr. 29, 1958 |
| 2,870,077 | Kushner | Jan. 20, 1959 |
| 2,870,078 | Hood | Jan. 20, 1959 |